United States Patent
Kanetsuki et al.

[11] 3,779,810
[45] Dec. 18, 1973

[54] METHOD OF MAKING A NICKEL POSITIVE ELECTRODE FOR AN ALKALINE BATTERY

[75] Inventors: Koji Kanetsuki, Neyagawa; Minoru Yamaga; Hiromichi Ogawa, both of Moriguchi, all of Japan

[73] Assignee: Matsushita Electric Industrial Co., Ltd., Osaka, Japan

[22] Filed: May 18, 1972

[21] Appl. No.: 254,411

Related U.S. Application Data

[63] Continuation of Ser. No. 56,474, July 20, 1970, abandoned.

[52] U.S. Cl. ............... 136/29, 136/76, 204/35 N, 204/96
[51] Int. Cl. ........................................ H01m 43/04
[58] Field of Search .................... 136/29, 76, 28; 204/35 N, 37 R, 56 R, 96

[56] References Cited
UNITED STATES PATENTS

| | | | |
|---|---|---|---|
| 3,335,033 | 8/1967 | Kober | 136/76 |
| 3,507,699 | 4/1970 | Pell et al. | 136/76 |
| 3,282,808 | 11/1966 | Kandler | 136/29 X |
| 3,527,614 | 9/1970 | Elema et al. | 136/76 X |
| 3,442,710 | 5/1969 | Menard | 136/76 X |
| 2,969,414 | 1/1961 | Fleischer | 136/29 |
| 3,248,266 | 4/1966 | Rampel | 136/29 X |

*Primary Examiner*—A. B. Curtis
*Assistant Examiner*—C. F. Lefevour
*Attorney*—Richard K. Stevens et al.

[57] ABSTRACT

A method of making a nickel positive electrode for use in an alkaline battery by immersing, a porous sintered plaque of nickel in an aqueous solution of a nitrate, nitrite nitro compound, amino compound, ammonate or the like of nickel, cathodically polarizing the nickel plaque so as to cause the continuous deposition of an active material forming substance in the pores of the plaque without the accompanyment of the undesirable generation of hydrogen and then immersing the cathodically polarized nickel plaque in water above 65° C, preferably above 95° C, to convert the active material forming substance into nickel hydroxide and also to convert a part of the metallic nickel constituting the plaque into nickel hydroxide thereby filling the pores of the plaque with the active material within a short period of time with high efficiency.

7 Claims, 2 Drawing Figures

METHOD OF MAKING A NICKEL POSITIVE ELECTRODE FOR AN ALKALINE BATTERY

CROSS-REFERENCE TO RELATED APPLICATION

This application is continuation of our co-pending application Ser. No. 56,474 filed on July 20, 1970 now abandoned.

BACKGROUND OF THE INVENTION

1. Field of the Invention

This invention relates to a method of making a positive electrode of nickel for use in a sintered type alkaline battery, and more particularly to improvements in the active material impregnating method including immersing a porous sintered body of nickel (hereinafter to be referred to as a nickel plaque) in an aqueous solution of nickel nitrate, nitrite, ammonate or the like, and cathodically polarizing the nickel plaque thereby causing the continuous deposition of an active material forming substance in the pores of the nickel plaque without undesirable accompanying generation of hydrogen.

2. Description of the Prior Art

It is commonly known that a sintered type alkaline battery has many advantages including a long service life, an excellent high-rate of charge-discharge characteristics, and especially excellent discharge characteristics at low temperatures. By virtue of these advantages, the alkaline battery has been finding increasing applications in many fields of industry. These advantages are derived from the fact that the plaque which is the active material supporter has a high porosity as well as a small thickness and the active material can be filled in a laminary developed state in the surface of the nickel plaque having a large surface area. Thus, the electrode has a low ohmic resistance and a small degree of polarization. A further advantage is that the metallic nickel constituting the plaque is electro-chemically inactive and stable in the alkaline electrolyte. Generally, a net or perforated sheet of nickel or nickel-plated steel is used as the grid of the nickel plaque. Therefore, the electrode is sufficiently tenacious, and in spite of the fact that the electrode is porous, it is possible to superimpose, for example, a positive electrode plate and a negative electrode plate on each other with a separator interposed therebetween and spirally wind the assembly to provide an electrode plate group. Almost all the cylindrical sealed nickel-cadmium batteries used as high-rate discharging batteries of the rechargeable type employed in cordless electrical apparatus in recent years include an electrode plate group of the spirally wound structure. Such a high-rate discharging, sealed nickel-cadmium battery which is capable of being quickly charged will occupy an important place in the demand for batteries in the future.

As will be understood from the above description, various advantages of a battery of this kind are derived from the excellent performance of the sintered electrode plate, and it is known in the art to impregnate the active material in a porous matrix such as a nickel plaque which is electrically conductive and electro-chemically stable. However, all of the conventional methods of making the electrode plate for sintered type alkaline batteries have had the drawback that the step of impregnating the active material must be repeated.

The plaque which is the active material supporter is obtained by sintering a powdered nickel such as carbonyl nickel having a small apparent density and an irregular shape in an atmosphere of reducing gas such as hydrogen at a temperature of 800° to 1,000° C so as to adhere metallic nickel on opposite surfaces of a net or perforated sheet of nickel or nickel-plated steel. The thickness and porosity of the nickel plaque range generally from 0.3 to 2.0 mm and from 75 to 85 percent, respectively. The pores of the plaque are finally filled with the active material in the form of nickel hydroxide to provide the positive electrode for the sintered type alkaline battery. Three methods have been known in the art for the manufacture of such a positive electrode. According to the first method, the nickel plaque is immersed in a concentrated aqueous solution of a nickel salt such as nickel nitrate which yields the active material and the air existing in the pores of the plaque is sufficiently replaced by the nickel salt solution so as to impregnate the plaque with the nickel salt solution. Thereafter, the plaque so impregnated with the nickel salt solution is generally dried. Subsequently, the plaque is immersed in an aqueous solution of caustic potash or caustic soda so as to convert the nickel salt contained in the pores of the plaque into nickel hydroxide. In the final step, the alkaline solution existing in excess must be washed away from the pores of the plaque and the plaque must be dried. These steps are absolutely necessary because the repetition of the impregnating operation becomes impossible. According to this immersion and precipitation method, all the steps described above must be repeated until the active material is impregnated up to the desired amount. This is because only a limited amount of nickel can be deposited in the pores of the plaque depending on the volume of the pores of the plaque and the concentration of the nickel salt solution. The impregnating operation according to this method generally required a total time of about 28 to 32 hours.

According to the second method, an aqueous solution of a nickel salt is impregnated into the pores of the plaque as in the first method, and then, without subjecting the plaque so impregnated with the nickel salt solution to intermediate drying, the plaque is directly immersed in an alkali bath, and at the same time cathodically polarized. While this impregnation and electrolysis method is effective in that nickel hydroxide acting as the active material can be uniformly distributed into the pores of the plaque, the steps of washing and drying must be repeated seven to eight times after the impregnation and cathodic polarization as in the case of the first method. The impregnating operation according to the second method generally required a total time of about 35 to 45 hours.

The third method is an improved method over the first and second methods described above. According to the third method, an aqueous solution of a nickel salt is impregnated into the pores of the plaque as in the first and second methods, and then the nickel salt is subject to thermal decomposition in an atmosphere of steam or air at a temperature of 180° to 250° C. When the nickel salt is nickel nitrate, a basic nickel salt represented by the formula $xNi(OH)_2 \cdot yNi(NO_3)_2$ is produced by the thermal decomposition and the values of $x$ and $y$ are approximately 7 and 3, respectively, although the composition is variable depending on the conditions of thermal decomposition. This immersion and thermal decomposition method does nt require the steps of washing and drying which occupy the substantial portions of the period of time required for the impregnating operation in the first and second methods, and the steps of immersion and thermal decomposition may be merely repeated. However, the third method is similar to the first and second methods in that the impregnating step must be repeated about seven to eight times. Further, after impregnating the basic nickel salt of desired amount in the pores of the plaque, it is necessary to immerse the plaque into an alkali solution to convert the nickel salt into nickel hydroxide. In the case of the third method, a total period of time of 8 to 9 hours is generally required for impregnating the active material in the pores of the plaque.

In an attempt to improve these impregnation methods which require repeated impregnating operation, are troublesome and require an extremely extended period of time, a continuous cathodic polarization method has been proposed according to which the active material can be uniformly impregnated within a short period of time by a continuous process. The continuous cathodic polarization method comrpises immersing the plaque in an aqueous solution of a nickel salt yielding the active material to sufficiently impregnate the pores of the plaque with the nickel salt solution and then cathodically polarizing the plaque. In this case, sufficient consideration should be given so as to inhibit any undesirable generation of hydrogen from the plaque serving as the cathode and to prevent any reduction of the nickel concentration in the electrolyte due to precipitation in order that the active material forming substance can be efficiently deposited in the pores of the plaque. More precisely, in order to suppress the undesirable generation of hydrogen, the electrolyte should contain therein an effective component such as a nitrate, nitrite or ammonate which has a potential nobler or higher than the hydrogen generation potential even at a high current density and is itself reduced to raise the pH value in the pores of the plaque serving as the cathode and in the vicinity of the plaque. Further, in order to prevent the undesirable reduction of the nickel concentration in the electrolyte, metallic nickel may be used as the anode, or a nickel compound such as nickel hydroxide or carbonate which is soluble to a free acid produced at the anode during the electrolysis may be added to the electrolyte, or a nickel salt may be directly supplied to the electrolyte. When, for example, the electrolyte is an aqueous solution of nickel nitrate, $NO_3^-$ ions are reduced by the electrolysis to produce ammonia and $OH^-$ ions, and the ammonia is arrested in the electrolyte in the form of an ammonium salt or ammonate so that the disadvantageous generation of gas does not occur. The formation of $OH^-$ ions due to the electrolyte reduction of $NO_3^-$ ions is rather preferable as it promotes the formation of nickel hydroxide or basic nickel salt. If hydrogen is generated at the cathode, the nickel salt deposited in the pores of the plaque is expelled by the bubbles of hydrogen so that the active material forming substance cannot be uniformly deposited in the deep portions of the pores of the plaque. Thus, the generation of hydrogen at the cathode is undesirable. For the impregnation of the active material in the positive electrode of nickel by such a continuous cathodic polarization method, a single impregnation step was generally sufficient although it depends upon the volume of the pores. Further, the electrolyte may be stirred to cause sufficient diffusion of nickel ions toward the plaque as the cathode, or the electrolyte may be circulated between the electrolytic vessel and the electrolyte composition adjusting tank so as to effect sufficient impregnation even at a considerably high current density. It will be seen that the continuous cathodic polarization method is advantageous in that the processing period of time can be reduced to less than one-fourth of the period of time required heretofore. However, in the present status, this method has involved some problems because of which it is not sufficiently successful from the industrial point of view. In other words, one of the problems involved in this method is the fact that the active material forming substance deposited in the pores of the plaque has been generally considered to be nickel hydroxide. The results of investigation made by the inventors have proved that the substance deposited by the cathodic polarization of the plaque in aqueous solution of nickel nitrate is amorphous when it is analyzed by the X-ray diffraction method, and has a specific gravity of about 2.4 to 2.6. Thus, it is apparent that this substance is not pure nickel hydroxide. Although the composition of this substance is not yet strictly confirmed, it is likely to be basic nickel salt or nickel ammonate containing an $NO_3$ radical or $NO_2$ radical or a mixture or chemical compound of the nickel salt and the nickel ammonate. This substance is very interesting from the viewpoint of study of the reaction mechanism. However, elucidation of such a reaction mechanism is not the principal subject of the present invention. When an alkaline battery is constituted by using the plaque impregnated with such nickel compound as the positive electrode, an important problem arises from the fact that the self-discharge of the battery is quite great and the battery has poor charge retention. This drawback is perhaps due to the reversible reaction of oxidation and reduction resulting from the inclusion of the nitrogen compound containing the $NO_3$ radical and $NO_2$ radical.

One of the important problems for battery manufacturers including the alkaline battery manufacturers is an improvement in the energy density of the battery to match the modern cordless electrical apparatus which are available in a variety of types with improved performances. Thus it is needless to say that an improvement in the energy density should also be done in the nickel positive electrode for use in the sintered type alkaline battery. More concretely, an improvement should be effected in the milliampere-hour capacity per cubic centimeter or specific capacity, mAh/cc. The specific capacity of the plaques obtained by the prior art methods including the immersion and precipitation method, immersion and cathodic polarization method, immersion and thermal decomposition method and continuous cathodic polarization method is generally of the order of 200 to 300 mAh/cc although it is variable depending upon the porosity of the plaque, and any further improvement in the specific capacity cannot be effectively attained from the viewpoint of productivity. Especially, according to the prior art continuous cathodic polarization method, an increase in the current supplied during the cathodic polarization over a certain limit would merely result in the attachment of the deposit to the plaque surfaces and cannot increase the amount of the active material forming substance to be impreganted in the pores of the plaque. As a result of the attachment of the active material forming substance to the plaque surfaces, the active material forming substance corresponding to about 50 to 60 percent of the volume of the plaque is only deposited in the pores of the plaque. Such a phenomenon is considered to result from the fact that the volume of the pores of the plaque is successively reduced as the active material forming substance is deposited in the pores and the electrolyte including the nickel salt cannot be sufficiently diffused into the deep portions of the pores.

SUMMARY OF THE INVENTION

It is a primary object of the present invention to provide a method of making a positive electrode of nickel for use in an alkaline battery comprising immersing a nickel plaque in an aqueous solution of nickel nitrate, nitrite, ammonate or the like, carrying out electrolysis by using the nickel plaque as the cathode to cause deposition of an active material forming substance in the pores of the nickel plaque, and, immediately after cathodic polarization, to immerse the nickel plaque whose pores are impregnated with the active material forming substance in hot water at a temperature above 65° C, preferably in hot water at a temperature above 95° C so as to convert the active material forming substance impregnated in the pores of the nickel plaque into nickel hydroxide, and at the same time, to convert a part of metallic nickel constituting the plaque into the active material or nickel hydroxide without impairing the practical mechanical strength of the nickel positive electrode, whereby to impregnate the active material in the plaque within a short period of time with high efficiency.

The present invention contemplates the provision of an improved method of making a positive electrode of nickel for use in an alkaline battery so as to improve the charge retention of the battery and to raise the specific capacity of the nickel positive electrode up to a level of at least 300 mAh/cc. According to the present invention, the plaque having been subjected to the continuous cathodic polarization is immersed in hot water at a temperature above 65° C, preferably in hot water at a temperature above 95° C for 20 to 30 minutes so as to convert the active material forming substance electrolytically deposited in the pores of the plaque into nickel hydroxide, and at the same time, to convert a part of the metallic nickel constituting the plaque into the active material thereby to remove the nitrogen compound which gives rise to undesirable self-discharging and to improve the specific capacity of the electrode.

DESCRIPTION OF THE PREFERRED EMBODIMENTS EMBODIMENT 1

Figure 1:
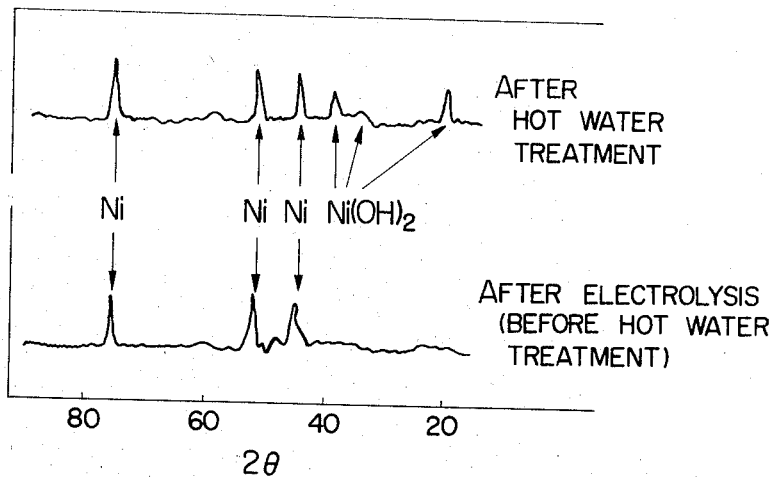
FIG. 1 is a graphic representation of X-ray diffraction images of the cathodically polarized nickel plaque before and after immersion with hot water in accordance with the present invention.

A nickel plaque having a thickness of 0.7 mm and a porosity of 80 percent is immersed in an aqueous solution containing 3.8 mols per liter of nickel nitrate and having a pH value of 0 to 0.5, and cathodically polarized while supplying current at a current density of 28 mA per square centimeter for 40 minutes for polarizing same. In this case, a pair of plates of metallic nickel are used as the anodes and are disposed on opposite sides of the plaque serving as the cathode, and the temperature of the electrolyte is kept at about 30° C. Upon completion of the cathodic polarization, the plaque is withdrawn from the electrolyte and is immediately immersed in hot water at a temperature above 95° C to be kept therein for 30 minutes. During the immersion of the plaque in the hot water, a greenish nickel compound of an amorphous nature which is electrolytically deposited in the pores of the plaque is converted into a whitish green nickel hydroxide of a crystalline nature. This state is illustrated by X-ray diffraction patterns of the nickel plaque in FIG. 1. It is to be further noted herein that the specific capacity of the positive electrode can be improved by the treatment with hot water described above. Although the electrolytically deposited nickel compound can be converted into nickel hydroxide by immersing the plaque in an alkaline solution such as a caustic potash or caustic soda solution, the specific capacity obtained in this case is of the order of 280 mAh/cc at the most, whereas according to the hot water immersion treatment employed in the present invention, the specific capacity attains a level of at least 300 mAh/cc, and in most cases, generally attains a level of the order of 330 mAh/cc. In the present embodiment, the period of time for treatment with hot water is set at 30 minutes. While an improvement in the specific capacity is observed with a longer period of time of hot water treatment, an elongated period of time of hot water treatment over a certain limit may weaken the bond between the grid and the sintered layer obtained by sintering nickel powder, with the result that the electrode plate may swell or the sintered layer may partially peel off the grid, and in an extreme case, may be collapsed to be rendered unusable. Even if such peeling or collapse does not occur, the porous layer of the plaque impregnated with the active material in the pores thereof may partially peel off during winding of the electrode plates to constitute the spirally wound electrode plate group previously described. Thus, the period of time of treatment with hot water should be set at a suitable value.

Figure 2:
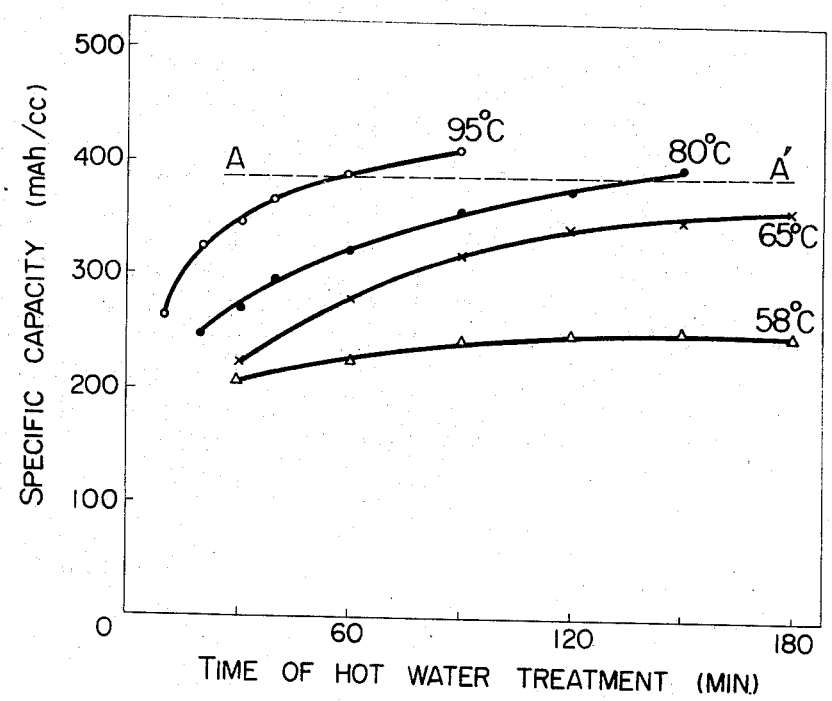
FIG. 2 is a graph showing the relation between the specific capacity and the time of hot water treatment in the method according to the present invention.

FIG. 2 shows the relation between the specific capacity of the positive electrode and the duration of the warm or hot water immersion treatment at various temperatures of the immersion bath. When the electrode plate is subjected to winding work as in the case of forming a spirally wound electrode plate group, the level A − A' shown in FIG. 2 should not be exceeded because the mechanical strength of the electrode plate is lowered. On the other hand, when the electrode plate is used in its flat form, the level A − A' may be slightly exceeded, but in this case too, the conditions of treatment should be set at a level below the level A − A' when an extended cycle life is expected. As will be understood from FIG. 2, any increase in the specific capacity cannot be expected in the case of warm water at a temperature below 65° C even with treatment over a long period of time. Therefore, at least 65° C is the minimum temperture required for successful treatment. When the temperature is about 95° C as in the present embodiment, a duration of treatment of 30 minutes is suitable and therefore the filling of the active material in the positive electrode is completed in about 70 minutes. It will be seen that the method according to the present invention is advantageous over the prior art methods described previously in that nickel hydroxide which is the active material can be impregnated within a short period of time which is about one-fourth to one-eighth of the previously required period of time at the most and a positive electrode plate having a higher specific capacity can be obtained.

It is preferable that nickel hydroxide in an excessive amount is initially added to and dispersed in the hot water to increase the pH value of the hot water in which the plaque is immersed after cathodic polarization. The pH value has a great influence on the reaction taking place in the hot water. It is apparent from the smell emerging from the hot water that the nickel compound changes to nickel hydroxide while liberating ammonia although the state of the nickel compound depositing in the pores of the plaque due to electrolysis is presently unknown and the reaction mechanism of the treatment with hot water is also unknown. This decomposition reaction is accelerated as the temperature is increased so that nickel ions or nickel complex ions can hardly dissolve into the hot water. Possibly, these ions may be subjected to hydrolysis to produce nickel hydroxide, but the presence of nickel hydroxide in a saturated amount in the hot water seems to suppress the elution of these ions into the hot water. By adding the nickel hydroxide in a saturated amount, the pH value of the hot water is kept at about 5.0 to 7.0 and is thus effective to promote the conversion of the electrolytically deposited nickel compound into nickel hydroxide. In the treatment according to the present invention which is accompanied by the conversion of a part of the plaque into the active material, an increase in the pH value toward the basic side beyond 7.0, for example, a pH value as high as 10 to 14 is undesirable because the conversion of a part of the plaque into the active material can hardly be expected. Further, an extreme decrease in the pH value toward the acidic side is also undesirable because the plaque is corroded within a short period of time until it is no longer usable. It is therefore an important point for the practice of the present invention to maintain the pH value of the warm or hot water at a neutralize point of 7.0 or a slightly acidic value. For this adjustment of the pH value, the addition of the ammonia water is also effective besides addition of nickel hydroxide. However, it is not an absolute requirement in the method of the present invention to add nickel hydroxide or ammonia water to the warm or hot water in the manner described above. This is because, the plaque having been subjected to cathodic polarization is treated with warm or hot water while the acidic electrolyte (or nickel nitrate in the case of EMBODIMENT 1) is attached thereto, and as nickel hydroxide is precipitated and drops off by reacting with the attached matter on the surface of the plaque and ammonia is produced during the conversion of the electrolytically deposited nickel compound into nickel hydroxide, the pH value of the solution is immediately stabilized at about 5.0 to 7.0. Although the reaction taking place in the treatment with hot water is not yet clarified, compounds such as nickel hydroxide and ammonia acting to increase the pH value at high temperature coexist with the acidic electrolyte such as nickel nitrate attached to the plaque surface so that the deposit can be converted into its hydroxide of a crystalline nature, and at the same time, the nickel constituting the plaque is corroded by the acidic solution at a pH value of 5.0 to 7.0 resulting in the formation of nickel hydroxide at the corroded portions. In lieu of the warm or hot water described above, therefore, a solution containing about 0.01 mol of ammonia and about 0.05 mol of nickel nitrate dissolved in water and having nickel hydroxide dispersed therein may be employed. An attempt has been made to increase the pH value of warm or hot water by adding thereto a strong alkali such as caustic soda or caustic potash in lieu of nickel hydroxide or ammonia water. However, it is difficult to maintain the pH value of the treating solution to about 7.0 and the pH value is unavoidably increased. Further, the conversion of a part of the plaque into the active material is suppressed with the result that a positive electrode having a low specific capacity can only be obtained as will be described later. Moreover, a step of washing with water for the purpose of removing the alkali is required after the treatment with hot water, and this washing step provides a bottleneck in a process in which the step of electrolytic impregnation is desirably repeated two or three times as in EMBODIMENT 2 described below.

EMBODIMENT 2

A nickel plaque having a porosity of 75 percent is immersed in an aqueous solution containing 2.0 mols per liter of nickel chloride and 1.0 mol per liter of sodium nitrite, and cathodically polarized while supplying current at a current density of 20 mA per square centimeter for 45 minutes, as in the case of EMBODIMENT 1. Upon completion of the cathodic polarization, the plaque is immediately immersed in boiled hot water containing 0.1 percent polyoxyethylene-alkylaryl-ether for 30 minutes. The plaque is withdrawn from the hot water and is immediately heated at a temperature of 80° to 90° C for 10 to 15 minutes for drying same. Thereafter, the steps of cathodic polarization and hot water treatment described above are repeated again. In this latter case, however, the treating periods of time are 20 minutes and 15 minutes, respectively. Any extension of the period of time the second cathodic polarization is undesirable in that surface deposition is liable to take place and no appreciable improvement in the effect can be expected. Further, the second hot water treatment is not especially effective for the conversion of a part of the plaque into the active material and is primarily aimed at converting the nickel compound electrolytically deposited during the second cathodic polarization into nickel hydroxide. In this case too, no appreciable improvement in the effect can be expected with an extension of the treatment period. The addition of a surface activator such as polyoxyethylene-alkylaryl-ether to the hot water is effective in promoting impregnation of the hot water into the deep portions of the pores of the plaque and to efficiently accelerate the reaction for converting a part of the plaque into the active material.

It will be understood from the foregoing description that the present invention is applicable to a process employing an electrolyte which contains, together with ions of nickel constituting the active material, ions of an effective component such as a nitrate, nitrite, ammonate or ammonium or a radical such as an amino radical which is electrolytically reduced at a potential higher than the potential at which hydrogen is generated at the plaque serving as the cathode during cathodic polarization so as to increase the pH value in the pores of the plaque as well as in the vicinity of the plaque. Practically, the component may be a nickel salt or compound of them, or any other nickel salt containing an alkali metal such as sodium, potassium or lithium or ammonium or a salt or compound thereof. Nickel nitrate is most preferred as it has a relatively high solubility and is commonly conveniently available.

In order to provide the effect of the present invention, sealed nickel-cadmium batteries, size AA, employing positive electrode plates made by various methods have been manufactured for the sake of experiment. These trial-manufactured batteries were tested at a temperature of 20 ± 3° C and were repeatedly charged at 50 mA for 15 hours and discharged at 100 mA until the voltage went down to 1.0 volt. The results of the test are shown in the following table:

| Impregnation method | Flaking from positive electrode (g) | Capacity (mAh) | Specific capacity of positive electrode (mAh/cc) | Cycle life (cycle) | Remarks |
|---|---|---|---|---|---|
| Immersion & precipitation | 0.10 | 491 | 292 | 420 | No. of times immersion —8 |
| Immersion & electrolysis | 0.06 | 477 | 284 | 600 | No. of times immersion —7 |
| Immersion & thermal decomposition | 0.04 | 521 | 310 | 800 | No. of times immersion —8 |
| Continuous electrolysis | | | | | No. of times immersion —1 |
| Without any post treatment | 0.07 | 460 | 274 | 705 | |
| Treated with N/10 caustic potash | 0.02 | 464 | 276 | 940 | |
| Treated with N/10 caustic soda | 0.03 | 466 | 277 | 880 | |
| Present invention | 0.02 | 580 | 345 | 1120 | |

The amount of flakings from the positive electrode in the table is measured on those which are different from the positive electrode plates chemically employed in the batteries. That is, each positive electrode plate is wound around a mandrel having a diameter of 3 mm and then restored to its original flat shape to measure the amount of flaking when the positive electrode plate is thus unwound. The ampere-hour capacity represents that measured upon the one-hundredth cycle. The positive electrode plates used for comparison had a size of 0.7 mm (thickness) × 40 mm (width) × 60 mm (length) which equals 1.68 cc. The positive electrode plates used in the test had a porosity of 80 percent. The cycle of these batteries represents the time at which internal short-circuiting occurred between the positive and negative electrode plates and seems to be somewhat correlated to the flakings from the positive electrode. A sintered cadmium electrode plate well known in the art and a piece of non-woven cloth of polyamide 0.2 mm thick were used as the negative electrode and the separator, respectively.

As will be apparent from the table, the method according to the present invention is advantageous over the prior art methods such as the immersion and precipitation method, impregnation and cathodic polarization method, and impregnation and thermal decomposition method utilizing the repeated impregnation of the active material in that the desired active material can be impregnated within a shorter period of time. Among the continuous cathodic polarization methods, the method according to the present invention including the treatment with hot water after cathodic polarization is most superior in that the positive electrode obtained thereby has a high specific capacity and the undesirable flakings of the active material from the positive electrode are reduced to a minimum.

While it is an important feature of the present invention to convert a part of metallic nickel constituting the plaque into the active material by the hot water treatment after cathodic polarization, excessive conversion of the plaque into the active material is undesirable as it deteriorates the mechanical strength of the electrode plate as previously pointed out. The allowable percentage of the part of the nickel plaque to be converted into the active material is from about 5 to 10 percent although it is variable depending upon the porosity or the degree of sintering of the plaque. When the plaque employed has a low porosity, the filling process including the steps of cathodic polarization and subsequent hot water treatment may be repeated as described in the case of EMBODIMENT 2.

What is claimed is:

1. A method of making a nickel positive electrode for use in an alkaline battery comprising the steps of preparing an electrolyte containing nickel ions and at least one of the group consisting essentially of nitrate ions, nitrite ions, ammonium ions and amino radical, placing a porous nickel plaque in said electrolyte, cathodically polarizing said plaque in said electrolyte so as to separate within the pores of said plaque an amorphous material for forming a positive electrode active material, and then immediately immersing for immersion treatment said plaque in hot water at a temperature of from 65° C to the boiling point for more than 20 minutes so as to convert said amorphous material into a crystalline active material.

2. A method of making a nickel positive electrode for use in an alkaline battery as claimed in claim 1, in which a weak basic substance such as nickel hydroxide or ammonia which does not impart any damage to the battery is added to said hot water to adjust the pH value of said warm or hot water in the range of 5.0 to 7.0.

3. A method of making a nickel positive electrode for use in an alkaline battery as claimed in claim 1, in which a part which is less than 10 percent of the metallic nickel constituting said nickel plaque is converted into the active material by the treatment with said hot water.

4. A method of making a nickel positive electrode for use in an alkaline battery as claimed in claim 1, in which said hot water contains 0.01 mol of a nitrogen compound therein.

5. A method of making a nickel positive electrode for use in an alkaline battery as claimed in claim 1, in which said hot water contains at least 0.05 mol of nickel ions therein.

6. A method of making a nickel positive electrode for use in an alkaline battery as claimed in claim 1, in which said hot water contains a surface active agent therein.

7. A method of making a nickel positive electrode for use in an alkaline battery comprising the steps of preparing an electrolyte containing nickel ions and at least one of the group consisting of nitrate ions, nitrite ions, ammonium ions and amino radical, placing a porous nickel plaque in said electrolyte, cathodically polarizing said plaque in said electrolyte so as to deposit within the pores of said plaque an amorphous material for forming a positive electrode active material, and then immediately immersing for immersion treatment said plaque in hot water at a temperature of from 95° C to the boiling point for from 20 to 30 minutes so as to convert said amorphous material into a crystalline active material.

* * * * *